United States Patent
Yamawaki et al.

(10) Patent No.: US 12,014,235 B2
(45) Date of Patent: Jun. 18, 2024

(54) WIRELESS COMMUNICATION DEVICE

(71) Applicant: Murata Manufacturing Co., Ltd., Nagaokakyo (JP)

(72) Inventors: Yoshinori Yamawaki, Nagaokakyo (JP); Ryosuke Washida, Nagaokakyo (JP); Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 595 days.

(21) Appl. No.: 17/227,787

(22) Filed: Apr. 12, 2021

(65) Prior Publication Data

US 2021/0232888 A1 Jul. 29, 2021

Related U.S. Application Data

(63) Continuation of application No. PCT/JP2019/033343, filed on Aug. 26, 2019.

(30) Foreign Application Priority Data

Oct. 15, 2018 (JP) .................................. 2018-194416

(51) Int. Cl.
*G06K 19/00* (2006.01)
*G06K 19/077* (2006.01)
(Continued)

(52) U.S. Cl.
CPC ..... *G06K 19/07745* (2013.01); *H01Q 1/2283* (2013.01); *H01Q 9/0407* (2013.01)

(58) Field of Classification Search
CPC ........... G06K 19/07745; H01Q 1/2283; H01Q 9/0407; H01Q 1/243; H01Q 1/00;
(Continued)

(56) References Cited

U.S. PATENT DOCUMENTS 8,009,047 B2 * 8/2011 Kanda .............. G06K 19/07798
340/572.1
2009/0278690 A1 * 11/2009 Degani ............ G06K 19/07749
340/572.1
(Continued)

FOREIGN PATENT DOCUMENTS

| JP | 2009053741 A | 3/2009 |
|---|---|---|
| JP | 2017112634 A | 6/2017 |
| WO | 2016072335 A1 | 5/2016 |

OTHER PUBLICATIONS

International Search Report issued for PCT/JP2019/033343, dated Oct. 21, 2019.
(Continued)

*Primary Examiner* — James J Yang
*Assistant Examiner* — Anthony D Afrifa-Kyei
(74) *Attorney, Agent, or Firm* — ArentFox Schiff LLP

(57) ABSTRACT

A wireless communication device is provided that includes an RFIC module having an RFIC chip and first and second terminal electrodes connected to the RFIC chip. An antenna member is provided that includes an antenna pattern having first and second coupling portions and an antenna base material on which the antenna pattern is disposed. Moreover, an insulating sticky layer is disposed between the RFIC module and the antenna member, and is provided for bonding the RFIC module to the antenna member. The first terminal electrode and the first coupling portion are capacitively coupled, with the sticky layer in between, and the second terminal electrode and the second coupling portion are capacitively coupled, with the sticky layer in between.

18 Claims, 14 Drawing Sheets

(51) Int. Cl.
*H01Q 1/22* (2006.01)
*H01Q 9/04* (2006.01)

(58) Field of Classification Search
CPC .. H01Q 1/12; H01Q 1/22; H01Q 1/24; H01Q 1/241; H01Q 1/242; H01Q 1/244; H01Q 21/065; H01Q 1/38; H01Q 21/08; H01Q 21/28; H01Q 9/285; H04M 1/0249
See application file for complete search history.

(56) References Cited

U.S. PATENT DOCUMENTS

| | | |
|---|---|---|
| 2016/0350638 A1 | 12/2016 | Kato et al. |
| 2017/0083804 A1* | 3/2017 | Kato ................ G06K 19/07786 |
| 2018/0060717 A1 | 3/2018 | Kato et al. |
| 2018/0114104 A1 | 4/2018 | Kato et al. |
| 2019/0138873 A1 | 5/2019 | Kato et al. |

OTHER PUBLICATIONS

Written Opinion of the International Searching Authority issued for PCT/JP2019/033343, dated Oct. 21, 2019.

* cited by examiner

WIRELESS COMMUNICATION DEVICE

CROSS REFERENCE TO RELATED APPLICATIONS

The present application is a continuation of PCT/JP2019/033343 filed Aug. 26, 2019, which claims priority to Japanese Patent Application No. 2018-194416, filed Oct. 15, 2018, the entire contents of each of which are incorporated herein by reference.

TECHNICAL FIELD

The present invention relates to a wireless communication device.

BACKGROUND ART

International Publication No. 2016/072335 (hereinafter referred to as "Patent Document 1") discloses a wireless communication device having an RFIC (Radio-Frequency Integrated Circuit) element (RFIC module) and a radiation conductor (antenna pattern) electrically connected to the terminal electrode of the RFIC element. Specifically, the terminal electrodes of the RFIC element are not fixed to the radiation conductor by solder or the like, but electrical connection between the terminal electrodes of the RFIC element and the radiation conductor is maintained by attaching a sticker covering the RFIC element to a base material disposed with a radiation conductor. As a result, even if the wireless communication device is deformed, for example, by being attached to a curved surface of an article, the electrical characteristics between the terminal electrodes of the RFIC element and the radiation conductor are maintained as before the deformation. Unlike this configuration, if the terminal electrodes and the radiation conductor are joined via solder, deformation of the wireless communication device may break the joint. As a result of the breakage, the electrical characteristics between the terminal electrodes and the radiation conductor change.

With the configuration of the wireless communication device described in Patent Document 1, when the wireless communication device deforms, especially when it repeatedly deforms, the terminal electrodes of the RFIC element and the radiation conductor may mutually slide, which may cause wear. The wear changes the electrical characteristics between the two, especially the contact resistance. As a result, the communication characteristics of the wireless communication device also change.

SUMMARY OF THE INVENTION

Therefore, the present invention provides a communication device, such that even if the wireless communication device having an antenna and an RFIC module including an RFIC chip deforms, the antenna is electrically connected to the terminal electrodes of the RFIC module while a change in the electrical characteristics therebetween is also suppressed.

According to an exemplary aspect of the present invention, a wireless communication device is provided that includes an RFIC module having an RFIC chip, a thin plate-shaped module base material having larger planar dimensions than the RFIC chip and on which the RFIC chip is disposed, and first and second terminal electrodes connected to the RFIC chip and disposed on the module base material. Moreover, an antenna member is provided that includes an antenna pattern having first and second coupling portions, and an antenna base material is provided on which the antenna pattern is disposed. An insulating sticky layer is disposed between the RFIC module and a main surface of the antenna member on which the first and second coupling portions of the antenna pattern are disposed, and is provided for bonding the RFIC module and the antenna member together, the first terminal electrode and the first coupling portion being capacitively coupled with the sticky layer in between, and the second terminal electrode and the second coupling portion being capacitively coupled with the sticky layer in between.

According to the exemplary aspects of the present invention, even if the wireless communication device having the antenna and the RFIC module including the RFIC chip deforms, the antenna and the terminal electrodes of the RFIC module can remain electrically connected together while suppressing the change in the electrical characteristics therebetween.

DETAILED DESCRIPTION

Figure 1:
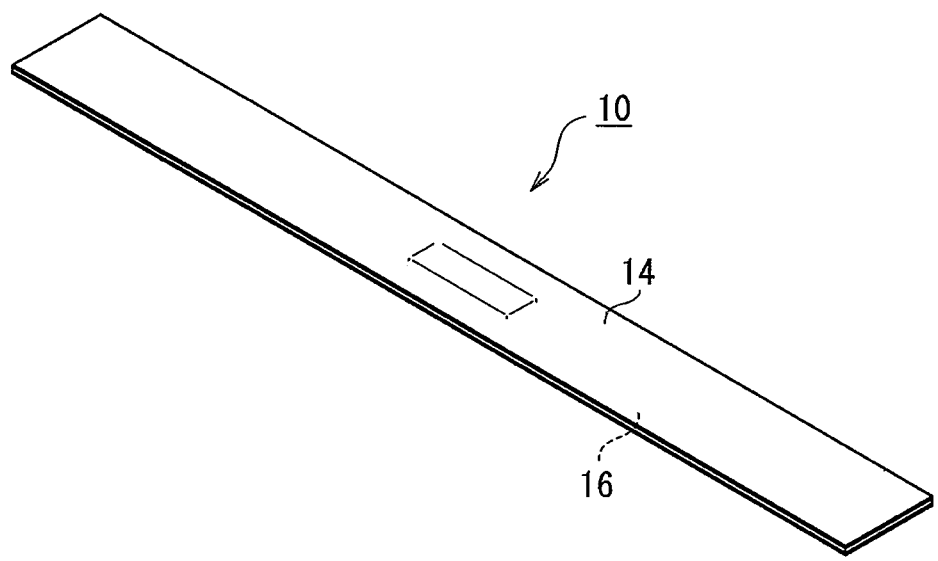
FIG. 1 is a perspective view of a wireless communication device according to a first exemplary embodiment.
Figure 1:
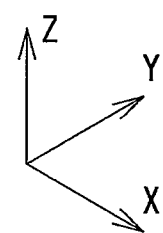

According to an exemplary aspect, a wireless communication device is provided that includes an RFIC module having an RFIC chip, a thin plate-shaped module base material having larger planar dimensions than the RFIC chip and on which the RFIC chip is disposed, and first and second terminal electrodes connected to the RFIC chip and disposed on the module base material. An antenna member is provided that includes an antenna pattern having first and second coupling portions, and an antenna base material is provided on which the antenna pattern is disposed. An insulating sticky layer is disposed between the RFIC module and a main surface of the antenna member on which the first and second coupling portions of the antenna pattern are disposed, for bonding the RFIC module and the antenna member together, with the first terminal electrode and the first coupling portion being capacitively coupled with the sticky layer in between, and the second terminal electrode and the second coupling portion being capacitively coupled with the sticky layer in between.

According to the exemplary aspect, even if the wireless communication device having the antenna and the RFIC module including the RFIC chip deforms, the antenna and the terminal electrodes of the RFIC module can remain electrically connected together while suppressing the change in the electrical characteristics therebetween.

According to an exemplary aspect, the sticking strength between the RFIC module and the sticky layer can be smaller than the sticking strength between the first and second coupling portions and the sticky layer. This configuration restrains at least a portion of the sticky layer from remaining on the RFIC module when the RFIC module is peeled off and reworked.

For example, the first and second terminal electrodes can be disposed on a main surface of the RFIC module that faces a main surface of the antenna member, and the sticking strength between the first and second terminal electrodes and the sticky layer may be smaller than the sticking strength between the first and second coupling portions and the sticky layer. This configuration restrains at least a portion of the sticky layer from remaining on the RFIC module when the RFIC module is peeled off and reworked.

To that end, for example, the surface roughness of contact surfaces of the first and second terminal electrodes in contact with the sticky layer can be smaller than the surface roughness of contact surfaces of the first and second coupling portions in contact with the sticky layer.

Moreover, a space can be disposed between the sticky layer and a portion of the RFIC module between the first terminal electrode and the second terminal electrode. This configuration enables the RFIC module to freely deform without being largely constrained by the sticky layer when the wireless communication device deforms.

For example, the sticky layer may be disposed continuously on the first coupling portion, the second coupling portion, and a portion of the antenna base material between the first coupling portion and the second coupling portion. This configuration allows the presence of the sticky layer between the first and the second coupling portions, thereby suppressing the variation in capacitance formed therebetween.

For example, in a stacking direction of the RFIC module, the sticky layer, and the antenna member, the size of the first coupling portion can be larger than the size of the first terminal electrode, while the size of the second coupling portion may be larger than the size of the second terminal electrode, and in the stacking direction, the pitch spacing between the first coupling portion and the second coupling portion and the pitch spacing between the first terminal electrode and the second terminal electrode may be specified so that the first terminal electrode can lie at the center of the first coupling portion and so that the second terminal electrode can lie at the center of the second coupling portion. Hereby, even if there is some variation in the adhesion position of the RFIC module to the antenna member, the terminal electrodes and the corresponding coupling portions can face each other for capacitive coupling.

For example, in the stacking direction, a first region enclosing the first and second terminal electrodes in a minimum area may lie within a contour line of the sticky layer, while the sticky layer may lie within a second region enclosing the first and second coupling portions in a minimum area. This configuration allows the presence of the sticky layer throughout between the terminal electrodes and the corresponding coupling portions, suppressing the variation in capacitance therebetween. Further, when the wireless communication device is conveyed, the sticky layer becomes less likely to adhere to the transport device.

For example, the RFIC module can comprise a matching circuit disposed between the RFIC chip and the first and second terminal electrodes. This configuration prevents variations, if any, in distance, i.e., in capacitance between the coupling portions and the terminal electrodes from substantially affecting the communication characteristics of the wireless communication device.

For example, the wireless communication device can further comprise a cover member disposed on the antenna member so as to cover the RFIC module. The RFIC module is hereby protected.

For example, the RFIC chip can be built in the module base material. The RFIC chip is hereby protected.

For example, the module base material and the antenna base material can have a flexibility. This configuration enables the wireless communication device to be affixed to a curved surface of an article.

The RFIC module can also be adhered to the sticky layer with a central portion of the RFIC module flexed convexly opposite to the sticky layer. This configuration improves the intimate adhesion properties between the RFIC module and the sticky layer.

Exemplary embodiments of the present invention will hereinafter be described with reference to the drawings.

First Exemplary Embodiment

Figure 2:
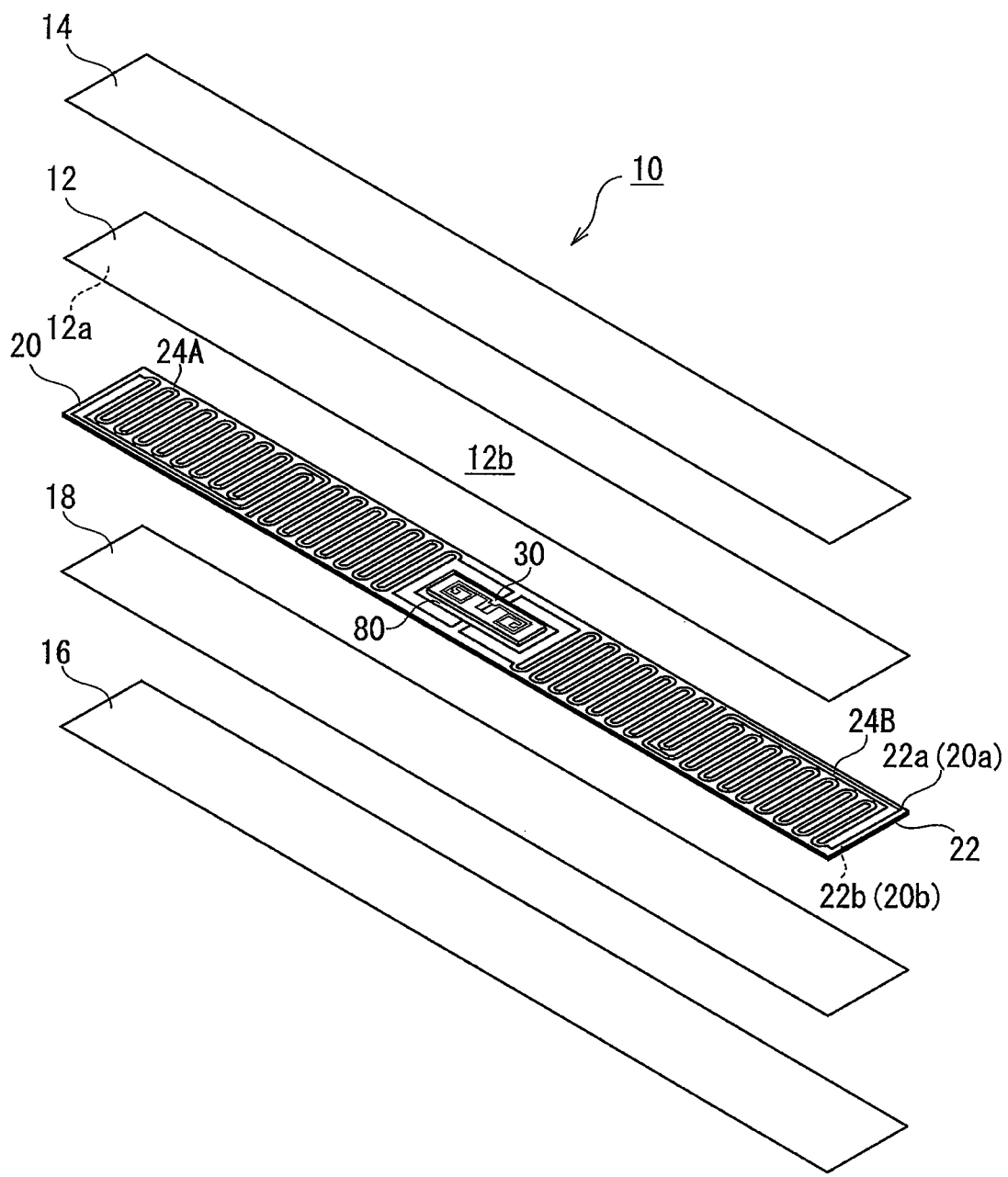
FIG. 2 is an exploded perspective view of the wireless communication device.

FIG. 1 is a perspective view of a wireless communication device according to a first exemplary embodiment, and FIG. 2 is an exploded perspective view of the wireless communication device. In the figures, an XYZ coordinate system is for facilitating the understanding of the invention and does not limit the invention. An X-axis direction indicates a longitudinal direction of the wireless communication device, a Y-axis direction indicates a width direction, and a Z-axis direction indicates a thickness direction according to the exemplary aspect.

As shown in FIG. 1, a wireless communication device 10 has a strip shape (e.g., elongated rectangular shape) and is used as a so-called RFID (Radio-Frequency IDentification) tag.

Specifically, as shown in FIG. 2, the wireless communication device 10 has an antenna member 20 and an RFIC (Radio-Frequency Integrated Circuit) module 30 disposed on the antenna member 20. Further, in the case of the first embodiment, the wireless communication device 10 has a double-sided tape 12, a mount 14, a print label 16, and a sticking agent 18 as components for use as an RFID tag. As used herein, the term "sticking" means "pressure sensitive adhesion" according to the exemplary aspect.

The double-sided tape 12 is, for example, a tape having a flexibility with a thickness of 30 μm and includes sticking surfaces 12a and 12b facing each other in the thickness direction (e.g., the Z-axis direction). In the case of the first embodiment, the sticking surface 12a on one hand is attached to the entirety of a first main surface 20a of the antenna member 20 having the RFIC module 30 disposed thereon. As a result, the double-sided tape 12 functions as a cover member that protects the first main surface 20a of the antenna member 20, i.e., that covers and protects the RFIC module 30. Further, the sticking surface 12b on the other is used when the wireless communication device 10 is attached to an article, and when not in use, it is covered and protected by the mount 14.

On the print label 16 there is printed, for example, information (e.g., an article name or a barcode) of the article to which the wireless communication device 10 is attached as the RFID tag. For example, the information is printed on the print label 16 by a printer. The print label 16 is attached to a second main surface 20b of the antenna member 20 via the sticking agent 18.

Figure 3:
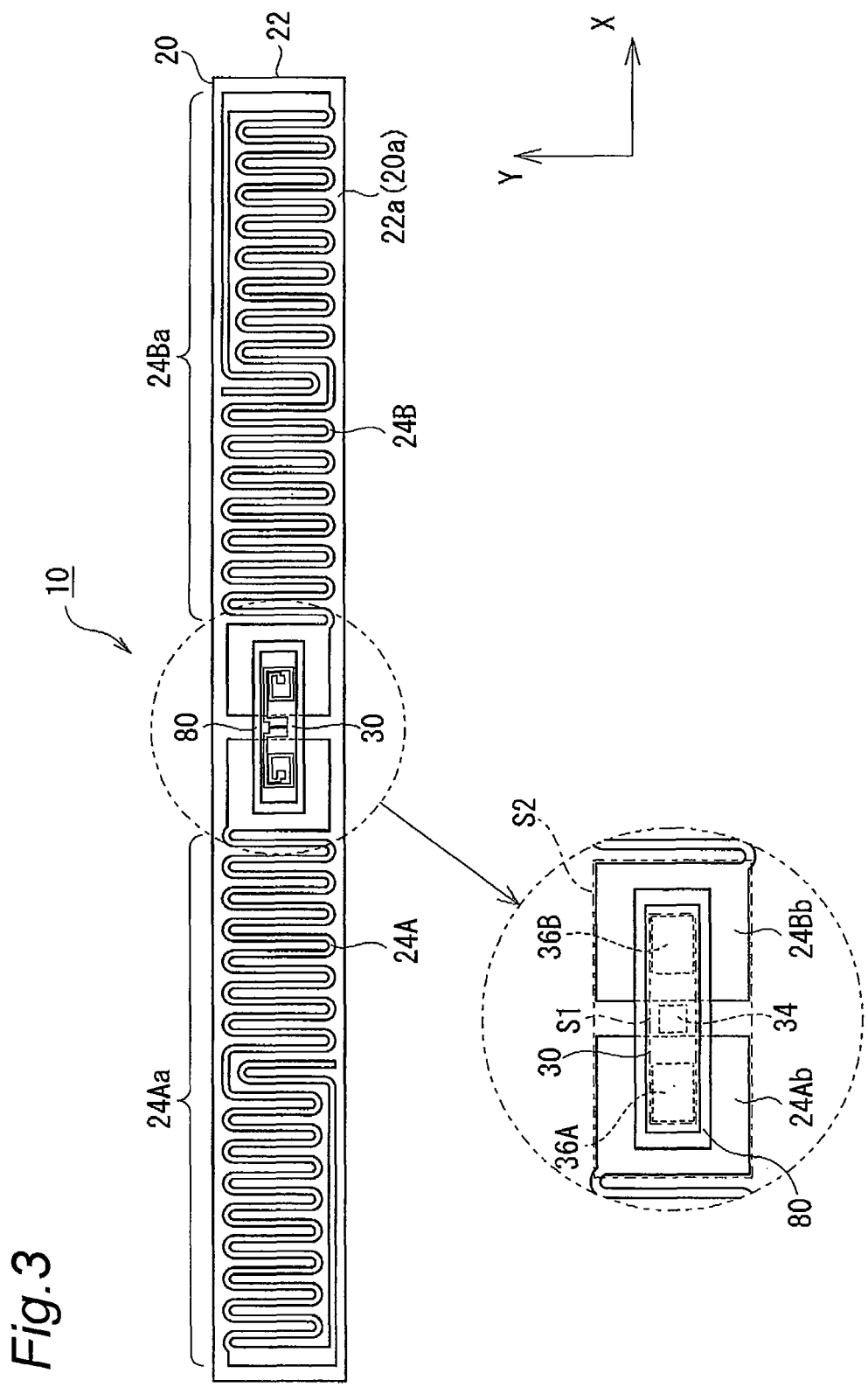
FIG. 3 is a top view of the wireless communication device.

FIG. 3 is a top view of the wireless communication device 10.

As shown in FIG. 3, the antenna member 20 of the wireless communication device 10 has a strip shape (e.g., elongated rectangular shape) and includes an antenna base material 22 and antenna patterns 24A and 24B disposed on a surface 22a on one hand of the antenna base material 22 (e.g., the first main surface 20a of the antenna member 20).

According to the exemplary aspect, the antenna base material 22 is a flexible sheet-like member with a thickness of approximately 40 μm, for example, made from an insulating material, such as a polyimide resin. Further, the antenna base material 22 includes the surface 22a and a surface 22b that function as the first main surface 20a and the second main surface 20b of the antenna member 20. Since the antenna base material 22 as a main component of the antenna member 20 has flexibility, the antenna member 20 can also have flexibility.

The antenna patterns 24A and 24B are used as antennas for the wireless communication device 10 to make wireless communication with an external communication device (e.g., a reader/writer in the case where the wireless communication device 10 is used as the RFID tag). In the first embodiment, the antenna patterns 24A and 24B are, for example, conductor patterns with thickness of 6 to 9 μm made from a conductor material such as silver, copper, or aluminum.

Further, the antenna patterns 24A and 25B include radiating portions 24Aa and 24Ba for transmitting and receiving radio waves and coupling portions 24Ab and 24Bb (e.g., first and second coupling portions) for electrical connection to the RFIC module 30.

In the first embodiment, the radiating portions 24Aa and 24Ba of the antenna patterns 24A and 24B are dipole antennas and have a meander shape extending towards the respective ends of the device. Further, the radiating portions 24Aa and 24Ba each extend from the coupling portions 24Ab and 24Bb disposed at a central portion in the longitudinal direction (e.g., X-axis direction) of the antenna base material 22 toward both ends of the antenna base material 22 and make a U-turn at those ends. In consequence, the tips (i.e., the open ends) are capacitively coupled to central portions of the radiating portions 24Aa and 24Ba, with the result that the antenna patterns 24A and 24B can resonate at a predetermined resonance frequency (e.g., the communication frequency).

Although the details will be described later, the coupling portions 24Ab and 24Bb of the antenna patterns 24A and 24B electrically connect to first and second terminal electrodes of the RFIC module 30. In the first embodiment, the coupling portions 24Ab and 24Bb are each a rectangular land.

Figure 4:
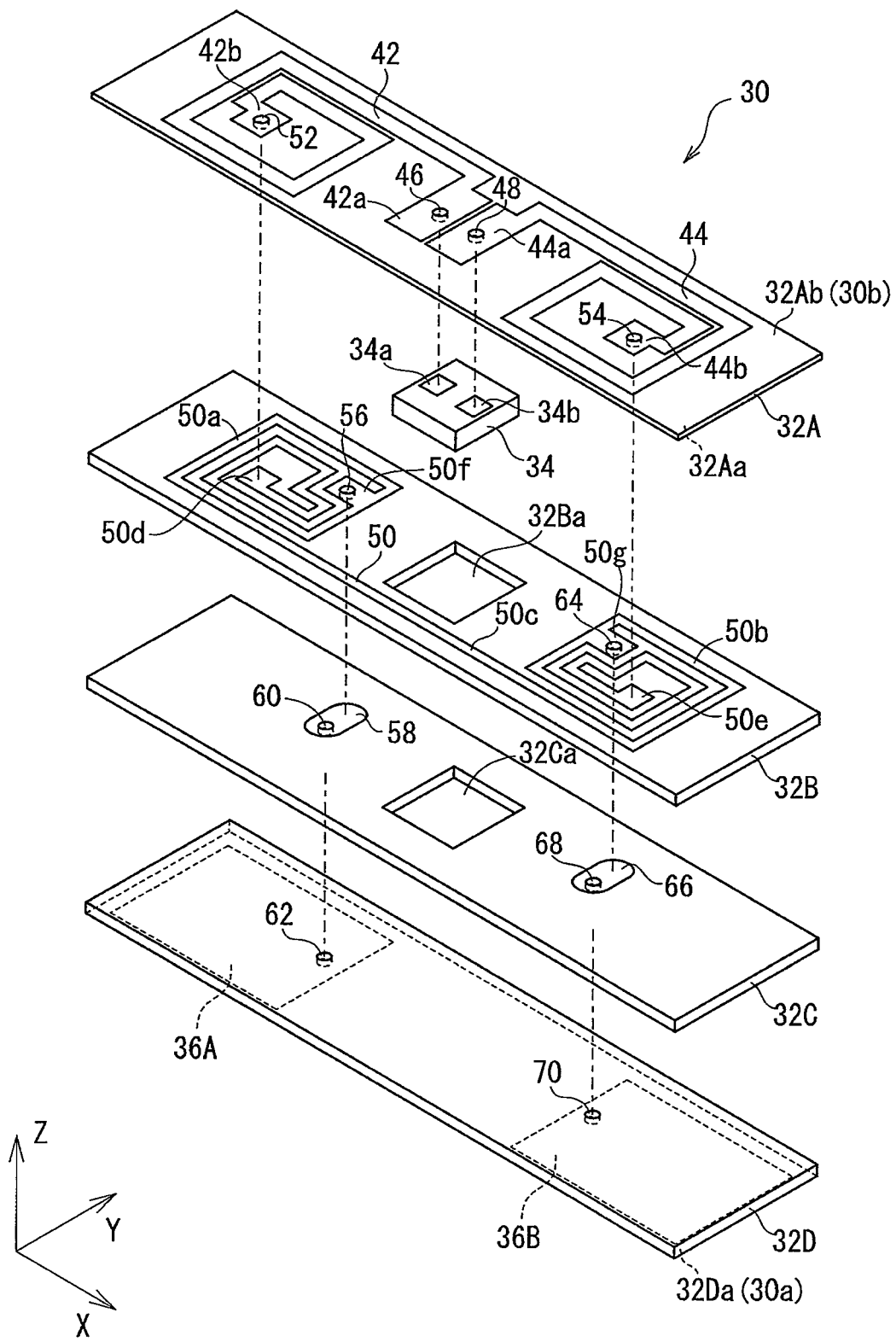
FIG. 4 is an exploded perspective view of an RFIC module.
Figure 5:
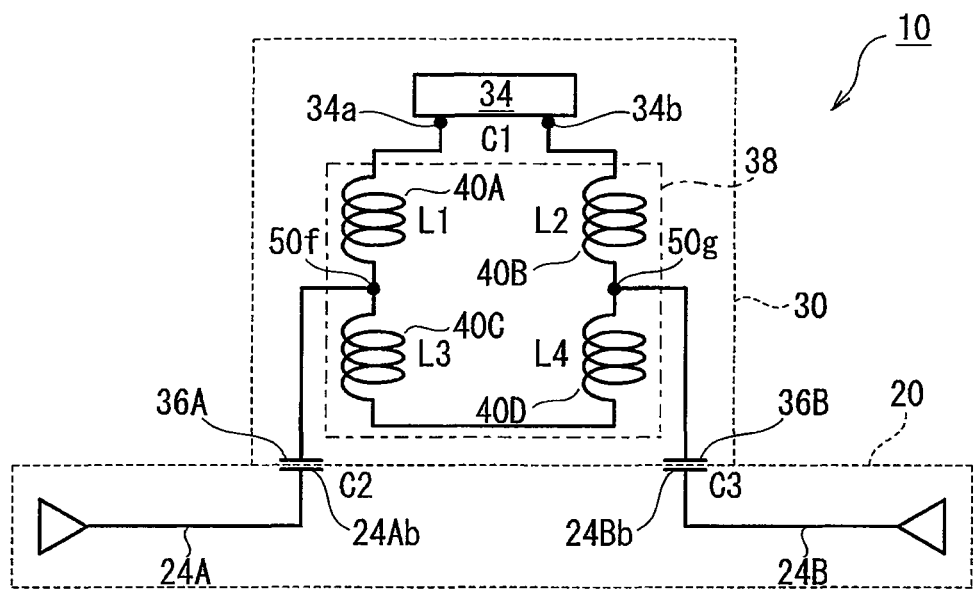
FIG. 5 is an equivalent circuit diagram of the wireless communication device.

FIG. 4 is an exploded perspective view of the RFIC module 30. FIG. 5 is an equivalent circuit diagram of the wireless communication device.

As shown in FIGS. 4 and 5, the RFIC module 30 is a device that is configured to perform a wireless communication via the antenna patterns 24A and 24B at a communication frequency in a 900 MHz band, i.e., a UHF band, for example.

As shown in FIG. 4, in the first embodiment, the RFIC module 30 is a strip-shaped (e.g., elongated rectangular) multilayer structure. Specifically, the RFIC module 30 includes, as a module base material that is a main component, four thin plate-shaped insulating sheets 32A to 32D made from an insulating material and stacked. Each of the insulating sheets 32A to 32D is a flexible sheet with a thickness of, for example, 25 to 50 made from an insulating material such as polyimide or liquid crystal polymer. Since the RFIC module 30 is formed by laminating such insulating sheets 32A to 32D, the RFIC module 30 can also have flexibility.

As shown in FIGS. 4 and 5, the RFIC module 30 includes an RFIC chip 34 and terminal electrodes 36A and 36B (e.g., first and second terminal electrodes) connected to the RFIC chip 34. Further, in the case of the first embodiment, the RFIC module 30 includes a matching circuit 38 disposed between the RFIC chip 34 and the terminal electrodes 36A and 36B. The module base material has larger planar dimensions than the RFIC chip 34. More specifically, in a plan view of the main surface of the module base material on which the RFIC chip 34 is disposed, the external dimensions of the module base material are larger than the external dimensions of the RFIC chip 34, i.e., the dimensional relationship is such that RFIC chip 34 can be included within the contour of the module base material.

The RFIC chip 34 is a chip driven by the UHF-band frequency (e.g., a communication frequency) and has a structure with various elements built into a semiconductor substrate made of semiconductor such as silicon. Further, the RFIC chip 34 includes a first input/output terminal 34a and a second input/output terminal 34b. Furthermore, as shown in FIG. 5, the RFIC chip 34 has an internal capacitance (capacitance: self-capacitance of the RFIC chip itself) C1. Here, the areas of the terminal electrodes 36A and 36B are larger than the areas of the first input/output terminal 34a and the second input/output terminal 34b. As a result, arranging the RFIC module 30 on the antenna patterns 24A and 24B is easier than arranging the RFIC chip 34 directly on the antenna patterns 24A and 24B, resulting in an improved productivity.

Further, in the first embodiment, as shown in FIG. 4, the RFIC chip 34 is built (or otherwise disposed) in the RFIC module 30 that is a multilayer structure. Specifically, the RFIC chip 34 is arranged between the insulating sheets 32A and 32D located on outer sides of the RFIC module 30 and is mounted on an inner surface 32Aa of the insulating sheet 32A. Further, the RFIC chip 34 is smaller than the insulating sheet 32A and is arranged at a center of the insulating sheet 32A in the longitudinal direction (e.g., X-axis direction) and the width direction (e.g., Y-axis direction). Note that the insulating sheets 32B and 32C sandwiched between the insulating sheets 32A and 32D are formed with through holes 32Ba and 32Ca, respectively, for accommodating the RFIC chip 34. In cases where the thickness (e.g., Z-axis direction size) of the RFIC chip 34 is small and/or where the thickness of the insulating sheet 32B is large, the insulating sheet 32C can be omitted. Advantageously, the RFIC chip 34 is protected by such a structure.

In the first embodiment, the terminal electrodes 36A and 36B are conductor patterns made from a conductor material such as silver, copper, or aluminum and are disposed on an outer surface 32Da of the insulating sheet 32D located on the outer side in the RFIC module 30 and forming a first main surface 30a of the RFIC module 30. The terminal electrodes 36A and 36B are rectangular in shape and are, for example, 1 μm in thickness. Note that, although described later, these first and second terminal electrodes 36A and 36B are electrodes for electrically connecting to the coupling portions 24Ab and 24Bb of the antenna patterns 24A and 24.

As shown in FIG. 5, in the case of the first embodiment, the matching circuit 38 disposed between the RFIC chip 34 and the first and second terminal electrodes 36A and 36B is composed of a plurality of inductance elements 40A to 40D.

The plurality of inductance elements 40A to 40D are each composed of a conductor pattern and an interlayer connecting conductor disposed on each of the insulating sheets 32A to 32D.

On an outer surface 32Ab of the insulating sheet 32A forming a second main surface 30b of the RFIC module 30, there are disposed conductor patterns 42 and 44 made from a conductor material such as silver, copper or aluminum. The conductor patterns 42 and 44 are spiral coil-shaped patterns and include, at outer peripheral ends, land portions 42a and 44a for electrically connecting to the RFIC chip 34. Note that the land portion 42a and the first input/output terminal 34a of the RFIC chip 34 are electrically connected via an interlayer connecting conductor 46 such as a through-hole conductor. The land portion 44a and the second input/output terminal 34b are electrically connected via an interlayer connecting conductor 48.

The insulating sheet 32B adjacent to the insulating sheet 32A is disposed with a conductor pattern 50 made from a conductor material such as silver, copper, or aluminum. The conductor pattern 50 includes spiral coil portions 50a and 50b arranged at both ends in the longitudinal direction (e.g., X-axis direction) of the RFIC module 30 and a connecting portion 50c connecting outer peripheral ends thereof.

A central end 50d of the spiral coil portion 50a on one hand of the conductor pattern 50 is electrically connected to a central end 42b of the spiral coil-shaped conductor pattern 42 via an interlayer connecting conductor 52 formed on the insulating sheet 32A. Further, the spiral coil portion 50a is configured so that current flowing through the conductor pattern 42 and current flowing through the spiral coil portion 50a have the same circulation direction.

A central end 50e of the spiral coil portion 50b on the other of the conductor pattern 50 is electrically connected to a central end 44b of the spiral coil-shaped conductor pattern 44 via an interlayer connecting conductor 54 formed on the insulating sheet 32A. Further, the spiral coil portion 50b is configured so that current flowing through the conductor pattern 44 and current flowing through the spiral coil portion 50b have the same circulation direction.

The spiral coil portions 50a and 50b of the conductor pattern 50 are disposed with connection terminal portions 50f and 50g, respectively, for connecting to the first and second terminal electrodes 36A and 36B.

The connection terminal portion 50f on one hand of the conductor pattern 50 on the insulating sheet 32B is electrically connected to the first terminal electrode 36A via an interlayer connecting conductor 56 on the insulating sheet 32B, a conductor pattern 58 and an interlayer connecting conductor 60 on the insulating sheet 32C, and an interlayer connecting conductor 62 on the insulating sheet 32D.

The connection terminal portion 50g on the other of the conductor pattern 50 on the insulating sheet 32B is electrically connected to the second terminal electrode 36B via an interlayer connecting conductor 64 on the insulating sheet 32B, a conductor pattern 66 and an interlayer connecting conductor 68 on the insulating sheet 32C, and an interlayer connecting conductor 70 on the insulating sheet 32D.

The conductor pattern 42 on one hand on the insulating sheet 32A and a portion of the spiral coil portion 50a from the central end 50d to the connection terminal portion 50f make up the inductance element 40A having an inductance L1. Further, a remaining portion of the spiral coil portion 50a forms the inductance element 40C having an inductance L3.

The conductor pattern 44 on the other on the insulating sheet 32A and a portion of the spiral coil portion 50b from the central end 50e to the connection terminal portion 50g make up the inductance element 40B having an inductance L2. Further, the remaining portion of the spiral coil portion 50b forms the inductance element 40D having an inductance L4.

By the matching circuit including the inductance elements 40A to 40D (also including the self-capacitance C1 of the RFIC chip 34), impedances between the RFIC chip 34 and the first and second terminal electrode 36A and 36B are matched at a predetermined frequency (e.g., communication frequency).

According to such a wireless communication device 10, when the antenna patterns 24A and 24B receive a radio wave (i.e., a signal) of a predetermined UHF-band frequency (e.g., communication frequency), a current corresponding to the signal flows from the antenna patterns 24A and 24B to the RFIC chip 34. When supplied with the current, the RFIC chip 34 is driven to output a current (i.e., a signal) corresponding to information stored in its internal storage unit (not shown) to the antenna patterns 24A and 24B. Then, a radio wave (signal) corresponding to the current is radiated from the antenna patterns 24A and 24B.

The configurations of the antenna member 20 and the RFIC module 30 in the wireless communication device 10 have been described so far. The mechanical and electrical connections between them will now be described.

Figure 6:
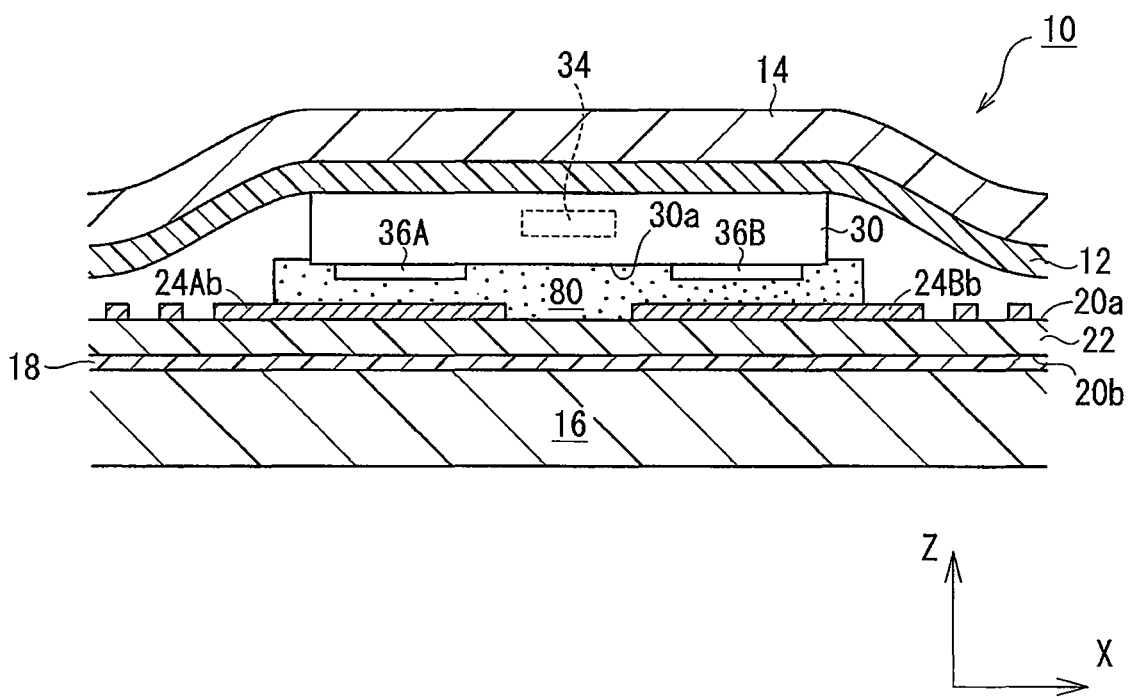
FIG. 6 is a partial cross-sectional view of the wireless communication device.

FIG. 6 is a partial cross-sectional view of the wireless communication device.

As shown in FIG. 6, an insulating sticky layer 80 is disposed between the first main surface 20a of the antenna member 20 having the antenna patterns 24A and 24B disposed thereon and the first main surface 30a of the RFIC module 30 having the terminal electrodes 36A and 36B disposed thereon.

The sticky layer 80 is a thin film of an insulating sticking agent. For example, the thickness of the sticky layer 80 is 5 to 100 μm. Further, the sticky layer 80 is made from, for example, a rubber-based, acrylic-based, silicon-based, or urethane-based sticking agent and has elasticity.

Here, the "sticky layer" will be described. In an exemplary aspect, the "sticky layer" is one type of an "adhesive layer" and is a layer intervening between two objects to bond the two objects together. As used herein, the "sticky layer" means a "pressure sensitive adhesive layer" and is distinguished from an "other adhesive layer".

Moreover, the "sticky layer" can be a solid that is substantially elastic or a liquid that is substantially viscous when it is sandwiched between two objects to bond them together. In the exemplary aspect, the "sticky layer" basically does not undergo a phase change immediately before and immediately after the two objects are bonded together.

It is also noted that the "sticky layer" may contain a solvent to facilitate application to the surface of an object (e.g., to increase fluidity). In this case, the two objects are bonded after the application to the surface of the object is completed and the solvent is sufficiently volatilized.

Further, the "sticky layer" adheres to the object when the object is pressed against it. Therefore, although the "sticky layer" has a low adhesive force, it is possible to separate the object from the "sticky layer" in a non-destructive manner. Note that a sticking force is measured by, for example, the test method specified in IEC60454-2.

In contrast to the "sticky layer", the "other adhesive layer" is generally a hard solid with substantially no elasticity when sandwiched by two objects to bond them together. Accordingly, the "other adhesive layer" is usually a liquid before bonding and only adheres to the object when it solidifies. The "other adhesive layer" is, for example, a layer of an epoxy-based thermosetting adhesive that solidifies by heat. Further, in a broad sense, solder is also included in the "other adhesive layer". In the case of the "other adhesive layer", due to a larger adhesive force than the sticky layer, it is difficult to separate from the object, with the result that if it is forcibly separated, the adhesive surface of the object may be partially destroyed.

In the case of comparing the "sticky layer" and the "other adhesive layer", when two objects in the bonded state are deformed, for example, by bending, the "other adhesive layer" is more easily destroyed than the "sticky layer". This is because the "other adhesive layer" is harder and has a higher deformation resistance than the "sticky layer". On the other hand, since the "sticky layer" has a lower deformation resistance than the "other adhesive layer", it deforms itself depending on the deformation of the object, to thereby relieve the stress concentration and prevent the destruction of itself.

Via the sticky layer 80 having such characteristics, the RFIC module 30 is adhered to the antenna member 20.

Specifically, as shown in FIG. 6, the sticky layer 80 is sandwiched between the coupling portions 24Ab and 24Bb in the antenna patterns 24A and 24B of the antenna member 20 and the terminal electrodes 36A and 36B of the RFIC module 30. As a result, the coupling portion 24Ab and the terminal electrode 36A are bonded and capacitively coupled together via the sticky layer 80 (i.e., a capacitance C2 is formed as shown in FIG. 5). Similarly, the coupling portion 24Bb and the terminal electrode 36B are bonded and capacitively coupled together via the sticky layer 80 (i.e., a capacitance C3 is formed). Due to such bonding, the terminal electrodes 36A and 36B and the coupling portions 24Ab and 24Bb do not come into direct contact with each other. Further, by such capacitive coupling, the RFIC chip 34 in the RFIC module 30 can perform wireless communication via the antenna patterns 24A and 24B.

Note that due to the capacitive coupling via the sticky layer 80, the distances between the coupling portions 24Ab and 24Bb and the terminal electrodes 36A and 36B may vary, that is, the capacitances C2 and C3 may vary. However, as shown in FIG. 5, since the matching circuit 38 matches the RFIC chip 34 and the terminal electrodes 36A and 36B at a predetermined resonance frequency (e.g., communication frequency), even if the capacitances C2 and C3 vary, the communication characteristics (for example, communication distance) of the wireless communication device 10 are not substantially affected.

To suppress the variation of the capacitive coupling (i.e., variations of the capacitances C2 and C3), in the first embodiment, when viewed from the direction (e.g., Z-axis direction) where the RFIC module 30, the sticky layer 80, and the antenna member 20 are stacked as shown in FIG. 2, the sizes of the coupling portions 24Ab and 24Bb of the antenna patterns 24A and 24B are respectively larger than the sizes of the corresponding terminal electrodes 36A and 36B of the RFIC module 30. At the same time, the pitch spacing between the terminal electrodes 36A and 36B and the pitch spacing between the coupling portions 24Ab and 24Bb are specified so that when viewed from the stacking direction, the terminal electrode 36A can lie at the center of the coupling portion 24Ab and that the terminal electrode 36B can lie at the center of the coupling portion 24Bb. As a result, even if there is some variation at the adhesion position of the RFIC module 30 with respect to the antenna member 20, the terminal electrode 36A and the coupling portion 24Ab can be capacitively coupled facing each other and the terminal electrode 36B and the coupling portion 24Bb can be capacitively coupled facing each other. Further, since the RFIC module 30 need not be mounted on the antenna member 20 with high positioning accuracy, the RFIC module 30 can be mounted on the antenna member 20 by using an inexpensive mounting device.

As for the positioning accuracy, naturally, high positioning accuracy is not required as compared to the case where the RFIC chip 34 is directly mounted on the antenna member 20 without being modularized as in the RIFC module 30. That is, in the case of the first and second input/output terminals 34a and 34b of the RFIC chip 34 having a smaller size and pitch spacing than the terminal electrodes 36A and 36B of the RFIC module 30 as shown in FIG. 4, their positioning accuracy is higher than the positioning accuracy of the terminal electrodes 36A and 36B. Therefore, an expensive mounting device is required and, in some cases, it may be necessary to inspect the energization between the RFIC chip 34 and the antenna patterns 24A and 24B after mounting.

Moreover, to further suppress the variation of the capacitive coupling (i.e., variations of the capacitances C2 and C3), in the first embodiment, when viewed from the direction (e.g., Z-axis direction) where the RFIC module 30, the sticky layer 80, and the antenna member 20 are stacked as shown in FIG. 2, a first region S1 enclosing the terminal electrodes 36A and 36B of the RFIC module 30 in a minimum area lies within a contour line of the sticky layer 80. At the same time, the sticky layer 80 lies within a second region S2 enclosing the coupling portions 24Ab and 24Bb in a minimum area. As a result, the sticky layer 80 is present throughout between the terminal electrodes 36A and 36B and the coupling portions 24Ab and 24Bb, so that in the plurality of wireless communication devices 10, the capacitances are restrained from varying therebetween and become constant. Further, since the sticky layer 80 is disposed in the second region S2, that is, substantially only in the coupling portions 24Ab and 24Bb, handling of the wireless communication device 10 becomes easy (for example, as compared with the case where the sticky layer 80 is disposed on the entire first main surface 20a of the antenna member 20). For example, when the wireless communication device 10 is conveyed, the possibility is reduced that the sticky layer 80 may adhere to a transport device.

As for the sticky layer 80, in the first embodiment, as shown in FIG. 6, the sticky layer 80 is continuously disposed on the coupling portions 24Ab and 24Bb of the antenna patterns 24A and 24B and on a portion of the antenna base material 22 between these coupling portions 24Ab and 24Bb. That is, the sticky layer 80 is integrally disposed not only on the coupling portions 24Ab and 24Bb but also between them. The sticky layer 80 is continuously formed, for example, by applying a sticking agent as a material of the sticky layer 80 continuously to the antenna member 20.

As shown in FIG. 6, the continuous disposition of the sticky layer 80 allows the sticky layer 80 to be present throughout between the coupling portions 24Ab and 24Bb of the antenna patterns 24A (i.e., in the longitudinal direction, X-axis direction). As a result, the variation in capacitance between the coupling portions 24Ab and 24Bb can be suppressed. Dissimilar to this, in the case where the sticky layer 80 is disposed only on the coupling portions 24Ab and 24Bb, when disposing it (i.e., when applying the sticking agent), part of it may penetrate between the coupling portions. Due to the variation in the amount of penetration, the capacitance between the coupling portions varies. As a result, the communication characteristics of the wireless communication device 10 vary. Thus, to prevent the capacitance between the coupling portions from varying, the sticky layer 80 is continuously disposed as shown in FIG. 6 such that the sticky layer 80 is present throughout between the coupling portions.

Further, in the first embodiment, as shown in FIG. 6, the sticky layer 80 adheres not only to the terminal electrodes 36A and 36B, but also to the entire first main surface 30a of the RFIC module 30. As a result, the adhesive force between the antenna member 20 and the RFIC module 30 is improved as compared with the case where only the terminal electrodes 36A and 36B adhere to the sticky layer 80.

Furthermore, in the first embodiment, the wireless communication device 10 is configured such that respective sticking strengths of the antenna member 20 and the RFIC module 30 to the sticky layer 80 are different. That is, the sticking strength between the RFIC module 30 and the sticky layer 80 is smaller than the sticking strength between the antenna member 20 and the sticky layer 80.

Thus, particularly specifically, the sticking strength between the terminal electrodes 36A and 36B of the RFIC module 30 and the sticky layer 80 is smaller than the sticking force between the coupling portions 24Ab and 24Bb in the antenna patterns 24A and 24B of the antenna member 20 and the sticky layer 80. This is because, in the first embodiment, the stick between the terminal electrodes 36A and 36B and the coupling portions 24Ab and 24Bb is dominant in the adhesion between the RFIC module 30 and the antenna member 20. That is, since the first main surface 30a of the RFIC module 30 and the first main surface 20a of the antenna member 20 are surfaces of a resin material such as polyimide, they have a low sticking force to the sticky layer 80 and do not contribute much to the adhesion between the RFIC module 30 and the antenna member 20.

To make the sticking strength between the terminal electrodes 36A and 36B and the sticky layer 80 smaller than the sticking force between the coupling portions 24Ab and 24Bb in the antenna patterns 24A and 24B and the sticky layer 80, for example, the surface roughness of the contact surfaces of the terminal electrodes 36A and 36B in contact with the sticky layer 80 is smaller than the surface roughness of the contact surfaces of the coupling portions 24Ab and 24Bb in contact with the sticky layer 80. It is noted generally that the surface roughness is, for example, an arithmetic mean roughness Ra.

Figure 7:
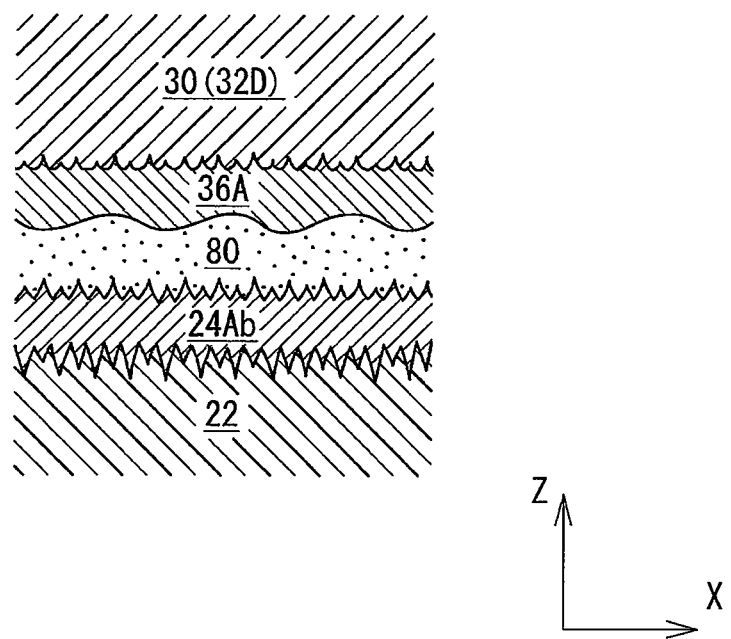
FIG. 7 is a cross-sectional view showing interfaces of a terminal electrode and a coupling portion with respect to a sticky layer.

FIG. 7 is a cross-sectional view showing interfaces of the terminal electrode and the coupling portion with respect to the sticky layer.

As shown in FIG. 7, since the surface roughness of the coupling portion 24Ab is larger than that of the terminal electrode 36A, the unevenness period on the surface of the coupling portion 24Ab is smaller than that of the terminal electrode 36A. Further, the amplitude of unevenness of the coupling portion 24Ab is larger than that of the terminal electrode 36A. Accordingly, the coupling portion 24Ab has a larger anchor effect than the terminal electrode 36A and hence has a larger sticking strength (i.e., a mechanical adhesion strength) on the sticky layer 80.

It is also noted that various methods exist for making a difference in the surface roughness in this way according to exemplary aspects.

For example, the antenna patterns 24A and 24B are made from metal leaf or by printing a conductor material. On the other hand, the terminal electrodes 36A and 36B are made by: shaping by etching; and thereafter plating the surface exposed by the masking removal (e.g., with gold). Thereby, the surface roughness of the terminal electrodes 36A and 36B can be made smaller than the surface roughness of the coupling portions 24Ab and 24Bb of the antenna patterns 24A and 24B.

Further, in the case where the terminal electrodes 36A and 36B and the coupling portions 24Ab and 24Bb are made from the same material and by the same method, the surface roughness of the former can be made smaller than the surface roughness of the latter by making the thickness of the former smaller than the thickness of the latter. For example, when etching is performed, the recess formed by the masking removal becomes deeper as the thickness increases. For that reason, as described above, the thickness of the terminal electrodes 36A and 36B is 1 μm, and the thickness of the coupling portions 24Ab and 24Bb of the antenna patterns 24A and 24B is 6 to 9 μm.

It is noted that in the first embodiment, also by the features other than the surface roughness, the sticking strength between the RFIC module 30 and the sticky layer 80 is made smaller than the sticking strength between the antenna member 20 and the sticky layer 80. Specifically, as shown in FIG. 3, in the laminating direction (e.g., Z-axis direction view), the RFIC module 30 is smaller than the sticky layer 80, and the sticky layer 80 is smaller than the antenna member 20. That is, in the contact area on the sticky layer 80, the RFIC module 30 is smaller than the antenna member 20. In this manner, the sticking strength can be made different depending on the difference in the contact area.

Description will be given of the reason why the sticking strength between the RFIC module 30 and the sticky layer 80 is made smaller than the sticking strength between the antenna member 20 and the sticky layer 80.

For example, if the antenna member 20 is found to be defective by the inspection after the RFIC module 30 is mounted on the antenna member 20 via the sticky layer 80, the RFIC module 30 mounted thereon can be peeled off and reworked. Specifically, when the RFIC module 30 is removed from the antenna member 20, the sticky layer 80 and the RFIC module 30 are separated, and the sticky layer 80 remains adhered to the antenna member 20. Therefore, the removed RFIC module 30 can be handled and mounted on another antenna member 20 as it is.

Unlike this configuration, if the sticking strength between the RFIC module 30 and the sticky layer 80 is larger than or equal to the sticking strength between the antenna member 20 and the sticky layer 80, at least part of the sticky layer 80 may remain on the RFIC module 30. In that case, the remaining sticky layer 80 may adhere to a transport device during handling of the removed RFIC module 30. Further, when mounted on another antenna member 20, it is necessary to remove the sticky layer 80 remaining on the RFIC module 30.

According to the first embodiment as described above, even if the wireless communication device 10 deforms, electrical connection can be achieved between the terminal electrodes 36A and 36B of the RFIC module 30 including the RFIC chip 34 and the coupling portions 24Ab and 24Bb of the antenna patterns 24A and 24B while suppressing changes in electrical characteristics therebetween.

Specifically, the terminal electrodes 36A and 36B and the coupling portions 24Ab and 24Bb are electrically connected (e.g., capacitively coupled) by the sticky layer 80. Thus, even if the wireless communication device 10 is deformed, the electrical characteristics between the terminal electrodes 36A and 36B and the coupling portions 24Ab and 24Bb are maintained by the sticky layer 80 as they were before the deformation. That is, even if the wireless communication device 10 is deformed, the terminal electrodes 36A and 36B and the coupling portions 24Ab and 24Bb do not come into direct contact with each other, and the sticky layer 80 is more easily deformed and hence is less likely to be damaged than the adhesive layer of a thermosetting adhesive, solder, etc., whereby the electrical characteristics are maintained.

Second Exemplary Embodiment

In the case of the above-described first embodiment, as shown in FIG. 6, the sticky layer 80 adheres to the entire first main surface 30a of the RFIC module 30. Dissimilar to this, in the case of a wireless communication device according to a second exemplary embodiment, the sticky layer adheres to part of the first main surface of the RFIC module. Accordingly, the second embodiment will be described focusing on the different point.

Figure 8:
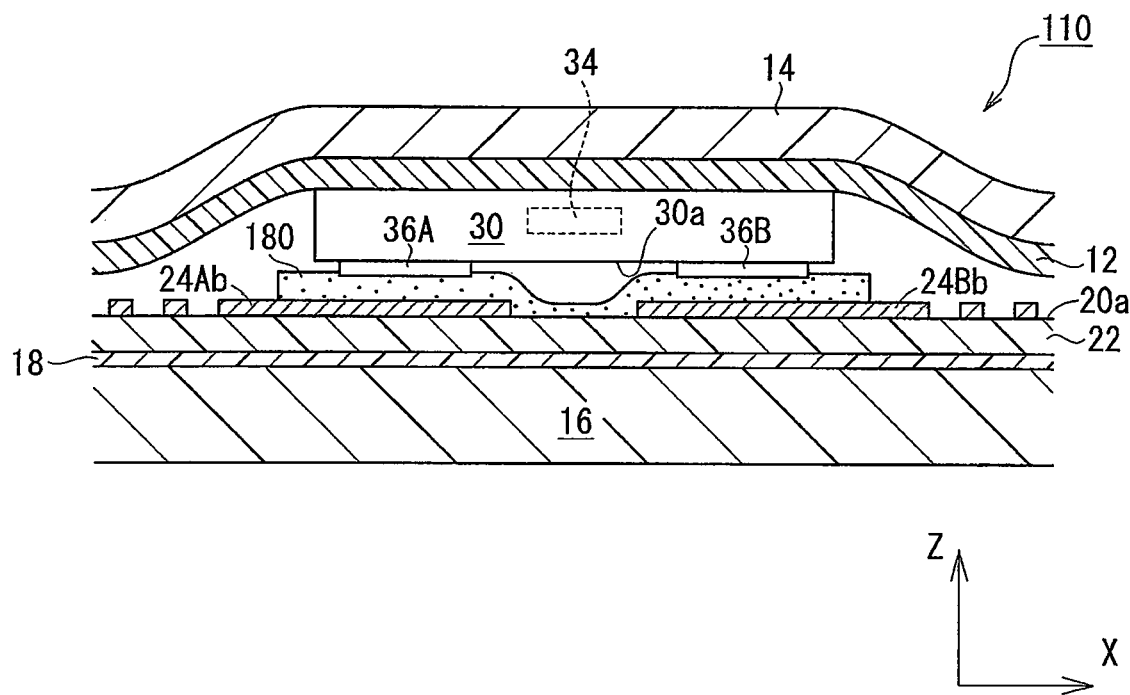
FIG. 8 is a partial cross-sectional view of a wireless communication device according to a second exemplary embodiment.

FIG. 8 is a partial cross-sectional view of the wireless communication device according to the second embodiment.

As shown in FIG. 8, in the case of a wireless communication device 110 according to the second embodiment, the RFIC module 30 does not adhere to a sticky layer 180 over the entire first main surface 30a, but adheres to the sticky layer 180 only via the terminal electrodes 36A and 36B. That is, a space is disposed between the sticky layer 180 and a portion of the first main surface 30a of the RFIC module 30 lying between the terminal electrodes 36A and 36B.

In this case, when the wireless communication device 110 deforms, the RFIC module 30 can freely deform without being largely constrained by the sticky layer 180. That is, the deformation of the central portion of the RFIC module 30 between the terminal electrodes 36A and 36B is suppressed. For example, when the entire first main surface 30a is adhered to the sticky layer, and when the sticky layer bends and deforms with a large curvature, the central portion of the RFIC module 30 is forcibly bent and deformed with a large curvature. On the other hand, as shown in FIG. 8, in the case where there is a space between the central portion of the RFIC module 30 and the sticky layer 180, even if the sticky layer bends and deforms with a large curvature, the central portion of the RFIC module 30 does not bend and deform with a large curvature since it is spaced apart from the sticky layer. As a result, bending deformation of the RFIC chip 34 of the RFIC module 30 can be suppressed when the sticky layer bends.

Similar to the above-described first embodiment, such a second embodiment can also achieve, even if the wireless communication device 110 deforms, electrical connection between the terminal electrodes 36A and 36B of the RFIC module 30 including the RFIC chip 34 and the coupling portions 24Ab and 24Bb of the antenna patterns 24A and 24B while suppressing changes in electrical characteristics therebetween.

Third Exemplary Embodiment

In the case of the above-described first embodiment, as shown in FIG. 6, the terminal electrodes 36A and 36B of the RFIC module 30 are exposed to the outside without being built in the RIFC module 30. For that reason, the terminal electrodes 36A and 36B are in contact with the sticky layer 80. Unlike this configuration, in a wireless communication device according to a third embodiment, the terminal electrodes of the RFIC module are not in contact with the sticky layer. The wireless communication device according to the third embodiment will be described with a focus on this difference.

Figure 9:
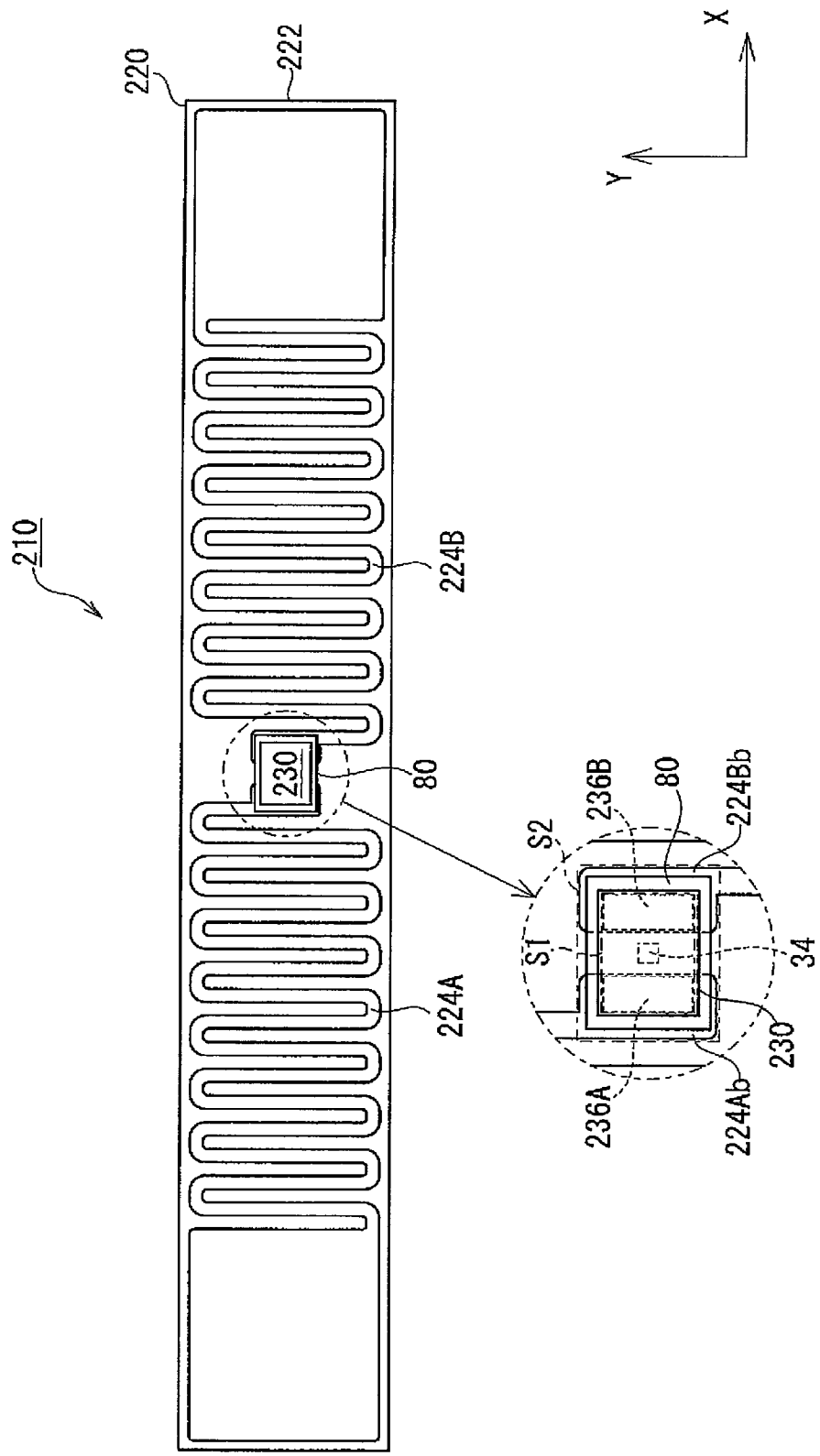
FIG. 9 is a top view of a wireless communication device according to a third exemplary embodiment.
Figure 10:
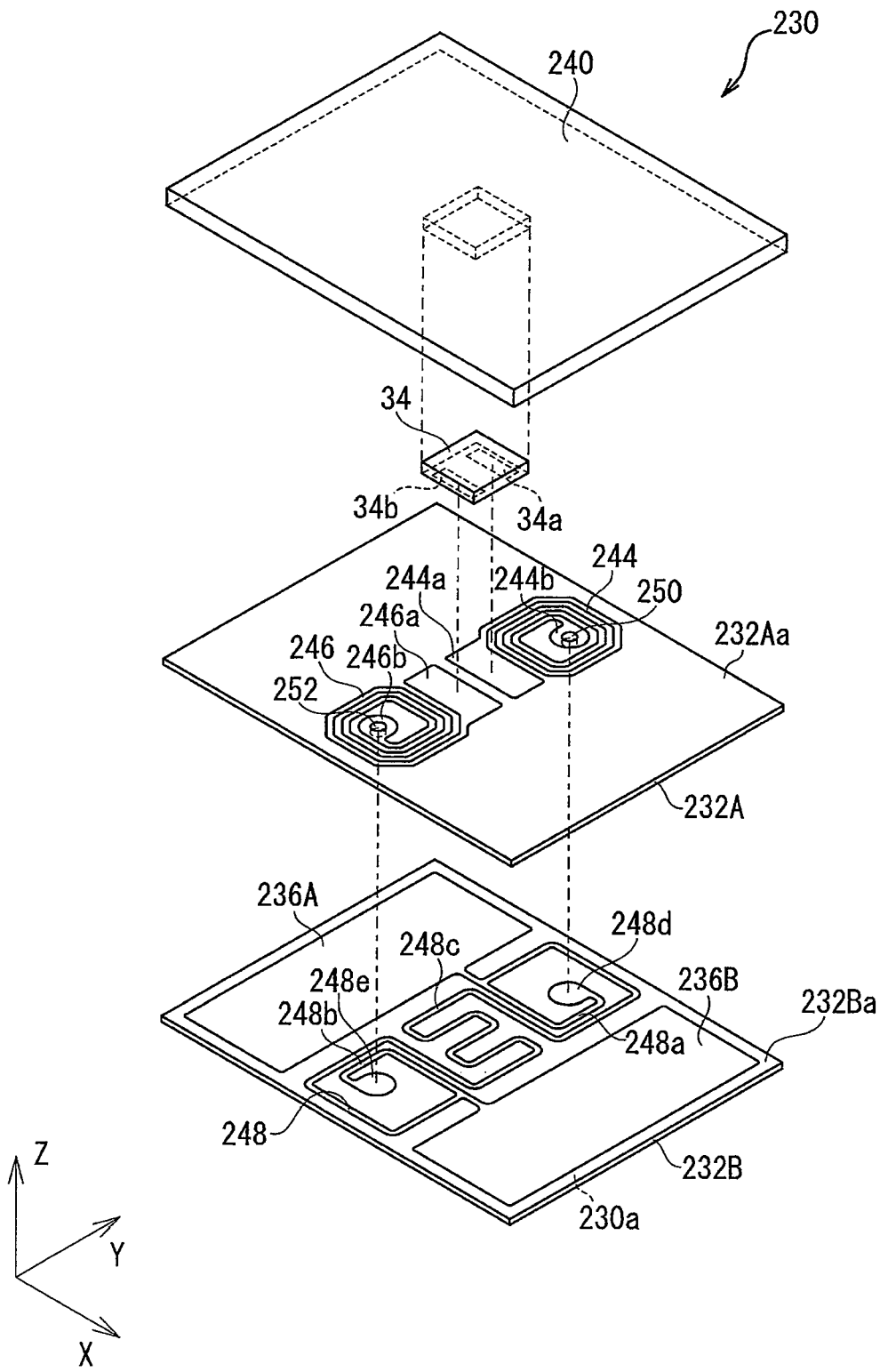
FIG. 10 is an exploded perspective view of an RFIC module in the wireless communication device shown in FIG. 9.

FIG. 9 is a top view of the antenna member of the wireless communication device according to the third embodiment. FIG. 10 is an exploded perspective view of the RFIC module in the wireless communication device shown in FIG. 9, and FIG. 11 is an equivalent circuit diagram of the wireless communication device shown in FIG. 9.

As shown in FIG. 9, a wireless communication device 210 according to the third embodiment has substantially the same structure, except for its RFIC module 230, as the wireless communication device 10 according to the above-described first embodiment shown in FIGS. 2 and 3. That is, an antenna member 220 of the wireless communication device 210 includes an antenna base material 222 and antenna patterns 224A and 224B disposed on the antenna base material 222 and including coupling portions 224Ab and 224Bb.

As shown in FIG. 10, the RFIC module 230 of the third embodiment is a multilayer structure. Specifically, the RFIC module 230 includes, as a module base material which is a main component, two thin plate-shaped insulating sheets 232A and 232B made from an insulating material and stacked. Each of the insulating sheets 232A and 232B is a flexible sheet made from an insulating material such as polyimide or liquid crystal polymers.

Figure 11:
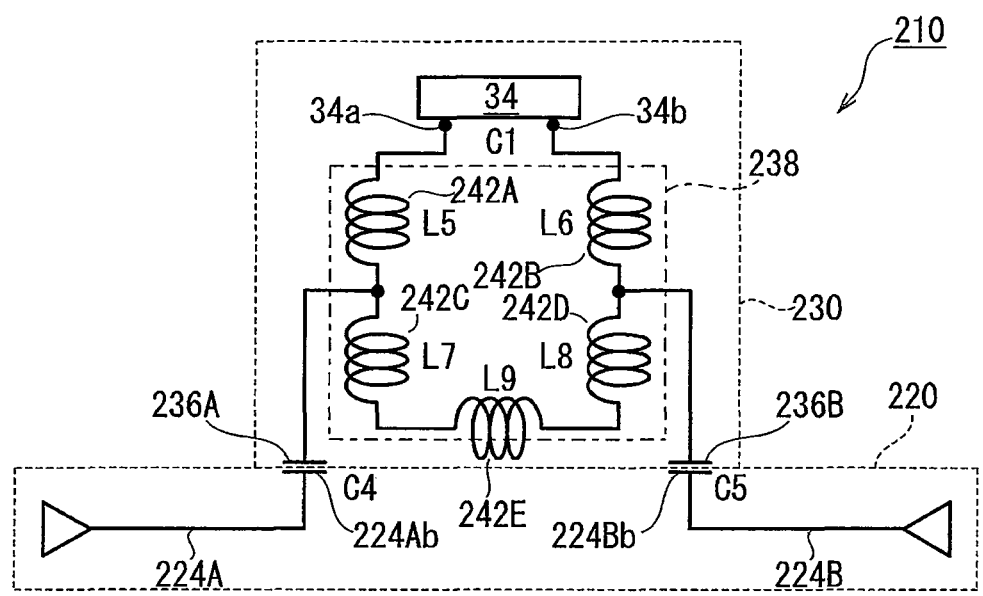
FIG. 11 is an equivalent circuit diagram of the wireless communication device shown in FIG. 9.

As shown in FIGS. 10 and 11, the RFIC module 230 includes the RFIC chip 34 and terminal electrodes 236A and 236B (i.e., first and second terminal electrodes) connected to the RFIC chip 34. Further, the RFIC module 230 includes a matching circuit 238 disposed between the RFIC chip 34 and the terminal electrodes 236A and 236B.

Further, as shown in FIG. 10, the RFIC chip 34 is built in the RFIC module 230 that is a multilayer structure. Specifically, the RFIC chip 34 is sealed in a resin package 240 arranged and formed on the insulating sheet 232A. The resin package 240 is made from an elastomer resin such as polyurethane or a hot melt resin. The RFIC chip 34 is protected by this resin package 240.

The terminal electrodes 236A and 236B are conductor patterns made from a conductor material, such as silver, copper or aluminum and are disposed on an inner surface 232Ba of the insulating sheet 232B constituting a first main surface 230a of the RFIC module 230 (i.e., a surface opposite to the first main surface 230a and facing the insulating sheet 232A). That is, in the case of the present embodiment, the terminal electrodes 236A and 236B are built in without being exposed to the outside.

As shown in FIG. 11, the matching circuit 238 disposed between the RFIC chip 34 and the terminal electrodes 236A and 236B is composed of a plurality of inductance elements 242A to 242E.

Each of the plurality of inductance elements 242A to 242E is composed of a conductor pattern disposed on each of the insulating sheets 232A and 232B.

As shown in FIG. 10, conductor patterns 244 and 246 made from a conductor material, such as silver, copper or aluminum, are disposed on an outer surface 232Aa (i.e., a surface on which the resin package 240 is disposed) of the insulating sheet 232A of the RFIC module 230. In this aspect, the conductor patterns 244 and 246 are each a spiral coil-shaped pattern and include, at their respective outer peripheral ends, land portions 244a and 246a, respectively, for electrically connecting to the RFIC chip 34. Note that the land portion 244a and the first input/output terminal 34a of the RFIC chip 34 are electrically connected to each other via, for example, solder or a conductive adhesive. Similarly, the land portion 246a and the second input/output terminal 34b are also electrically connected to each other.

As further shown in FIG. 11, the spiral coil-shaped conductor pattern 244 on one hand on the insulating sheet 232A constitutes the inductance element 242A having an inductance L5. Further, the spiral coil-shaped conductor pattern 246 on the other constitutes the inductance element 242B having an inductance L6.

A conductor pattern 248 made from a conductor material such as silver, copper, or aluminum is disposed on the insulating sheet 232B adjacent to the insulating sheet 232A. The conductor pattern 248 includes the terminal electrodes 236A and 236B, spiral coil portions 248a and 248b, and a meander portion 248c. On the insulating sheet 232B, the spiral coil portions 248a and 248b and the meander portion 248c are arranged between the terminal electrodes 236A and 236B.

The spiral coil portions 248a on one hand of the conductor pattern 248 on the insulating sheet 232B is electrically connected to the terminal electrode 236A. Further, a central end 248d of the spiral coil portion 248a is electrically connected, through an interlayer connecting conductor 250 such as a through-hole conductor formed on the insulating sheet 232A, to a central end 244b of the spiral coil-shaped conductor pattern 244 on the insulating sheet 232A. Further, as shown in FIG. 11, the spiral coil portion 248a constitutes the inductance element 242C having an inductance L7.

The spiral coil portion 248b on the other of the conductor pattern 248 on the insulating sheet 232B is electrically connected to the terminal electrode 236B. Further, a central end 248e of the spiral coil portion 248b is electrically connected, through an interlayer connecting conductor 252 such as a through-hole conductor formed on the insulating sheet 232A, to a central end 246b of the spiral coil-shaped conductor pattern 246 on the insulating sheet 232A. Further, as shown in FIG. 11, the spiral coil portion 248b constitutes the inductance element 242D having an inductance L8.

The meander portion 248c of the conductor pattern 248 on the insulating sheet 232B electrically connects an outer peripheral end of the spiral coil portion 248a on one hand and an outer peripheral end of the spiral coil portion 248b on the other. Further, as shown in FIG. 11, the meander portion 48c constitutes the inductance element 242E having an inductance L9.

The impedances between the RFIC chip 34 and the terminal electrodes 236A and 236B are matched at a predetermined frequency (e.g., a communication frequency) by the matching circuit 238 including such inductance elements 242A to 242E (and also including the self-capacitance C1 of the RFIC chip 34).

According to the RFIC module 230 having such a structure, the terminal electrodes 236A and 236B are built in the RFIC module 230 without being exposed to the outside.

Figure 12:
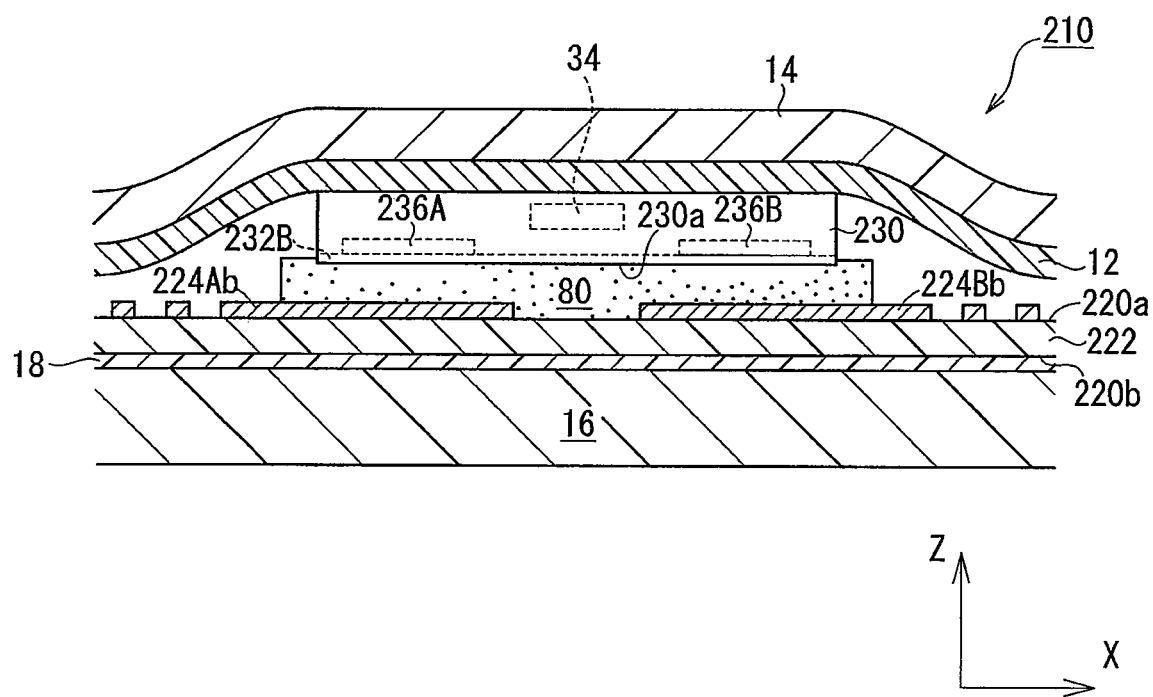
FIG. 12 is a partial cross-sectional view of the wireless communication device shown in FIG. 9.

FIG. 12 is a partial cross-sectional view of the wireless communication device shown in FIG. 9.

As shown in FIG. 12, the sticky layer 80 is sandwiched between and bonds together a first main surface 230a of the RFIC module 230 and a first main surface 220a of the antenna member 220 on which the coupling portions 224Ab and 224Bb of the antenna patterns 224A and 224B are disposed. As a result, the coupling portion 224Ab and the terminal electrode 236A are capacitively coupled (i.e., a capacitance C4 is formed as shown in FIG. 11) via the sticky layer 80 and the insulating sheet 232B. Similarly, the coupling portion 224Bb and the terminal electrode 236B are capacitively coupled (i.e., a capacitance C5 is formed) via the sticky layer 80 and the insulating sheet 232B. By such adhesion, the terminal electrodes 236A and 236B are capacitively coupled to the coupling portions 224Ab and 224Bb without any contact with the sticky layer 80. Further, by such capacitive coupling, the RFIC chip 34 within the RFIC module 230 can perform wireless communication by way of the antenna patterns 224A and 224B.

Further, in the case of the third embodiment, the sticky layer 80 adheres to the RFIC module 230 via the insulating sheet 232B made from an insulating material such as polyimide or a liquid crystal polymer. Further, the sticky layer 80 adheres to the coupling portions 224Ab and 224Bb of the antenna patterns 224A and 224B made from a conductor material such as silver, copper or aluminum. For that reason, the sticking strength between the RFIC module 230 and the sticky layer 80 is smaller than the sticking strength between the coupling portions 224Ab and 224Bb and the sticky layer 80.

Similar to the above-described first embodiment, such a third embodiment can also achieve, even if the wireless communication device 210 deforms, electrical connection between the terminal electrodes 236A and 236B of the RFIC module 230 including the RFIC chip 34 and the coupling portions 224Ab and 224Bb of the antenna patterns 224A and 224B while suppressing changes in electrical characteristics therebetween.

It is noted that the present invention has been described hereinabove with reference to the above-described exemplary embodiments, but these embodiments are not limited thereto.

For example, in the case of the above-described first embodiment, as shown in FIG. 4, the RFIC module 30 is a multilayer structure, but the exemplary embodiments are not limited thereto. For example, the RFIC module may be a single-layer structure in which the RFIC chip and the terminal electrodes are disposed on a single module base material. Further, for example, the RFIC module may be a package module having a single module base material whose one main surface is disposed with the RFIC chip and a package covering the RFIC chip and whose other surface is disposed with the terminal electrodes.

Further, in the case of the above-described first embodiment, as shown in FIG. 3, the antenna pattern of the antenna member 20 is a dipole antenna and is composed of the two antenna patterns 24A and 24B. However, the in an alternative embodiment, the antenna pattern of the antenna member may be a one-piece loop antenna. In this case, the coupling portions are disposed at both ends of the loop antenna.

Further, in the case of the above-described first embodiment, as shown in FIG. 6, in the wireless communication device 10 used as an RFID tag, the print label 16 is disposed on the second main surface 20b of the antenna member 20 (e.g., antenna base material 22), i.e. on the main surface not mounted with the RFIC module 30. However, the embodiments are not limited thereto.

Figure 13:
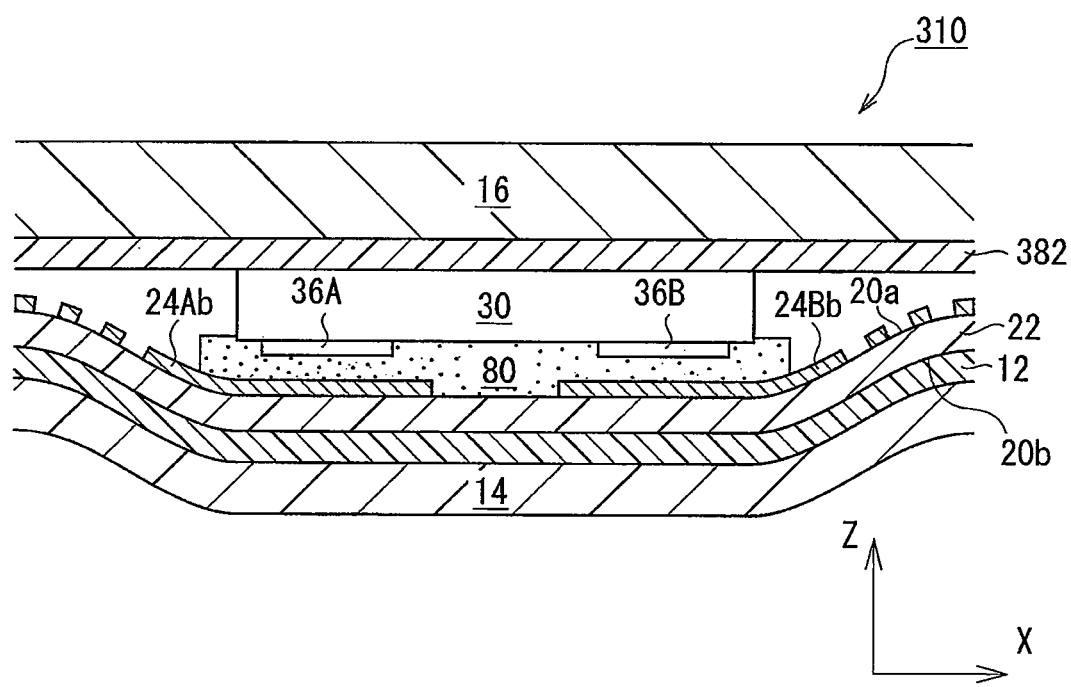
FIG. 13 is a partial cross-sectional view of a wireless communication device according to an additional exemplary embodiment.

FIG. 13 is a partial cross-sectional view of a wireless communication device according to another exemplary embodiment.

As shown in FIG. 13, in a wireless communication device 310 according to the other embodiment, the print label 16 is attached via a double-sided tape 382 to the first main surface 20a, instead of the second main surface 20b of the antenna member (e.g., antenna base material 22). That is, the RFIC module 30 is sandwiched between the print label 16 and the antenna base material 22. In this case, considering printing on the print label 16, the antenna substrate 22 is partially curved so that the print label 16 is kept flat, thereby securing the arrangement space for the RFIC module 30 between the print label 16 and the antenna base material 22.

It is noted that, in the case where the print label is already installed in the wireless communication device used as the RFID tag (e.g., in the case where it is already attached to the antenna member), considering the ease of printing, as described above, the printed label is preferably in a flat state. However, if printed prior to attachment to the antenna member, the print label may be affixed to the antenna member in a partially curved state in order to secure the arrangement space for the RFIC module.

Furthermore, in the case where the RFIC module 30 has a flexibility as in the above-described first embodiment, the RFIC module 30 may be adhered in a flexed state to the sticky layer 80.

Figure 14:
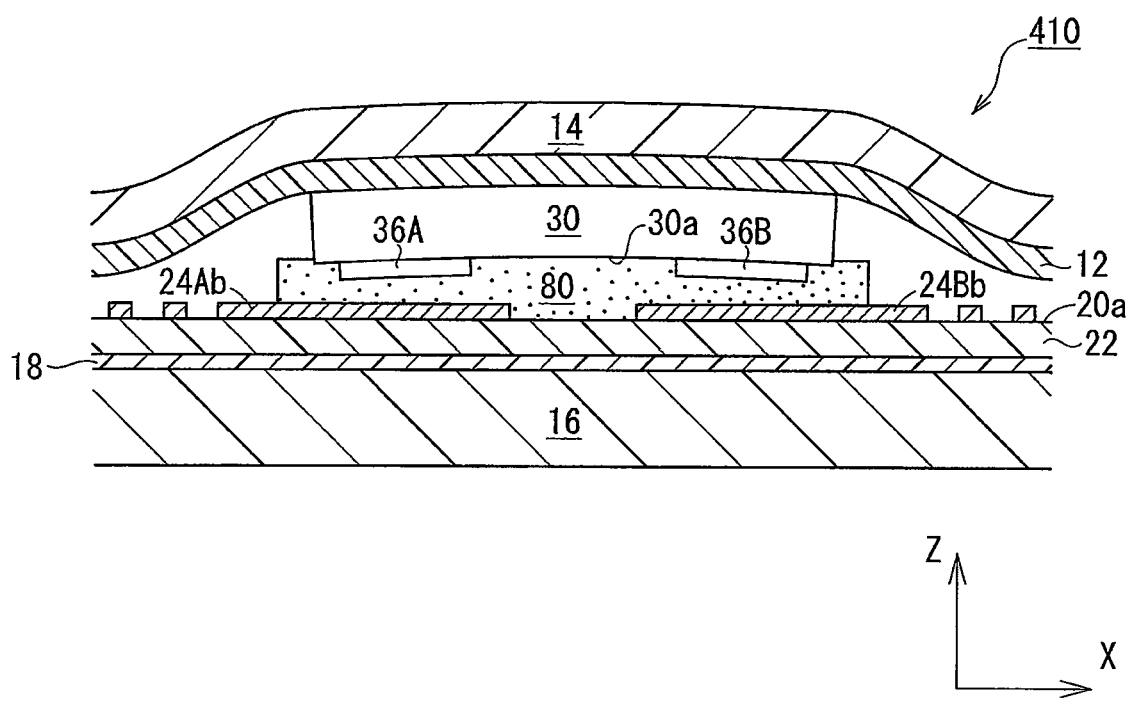
FIG. 14 is a partial cross-sectional view of a wireless communication device according to yet another exemplary embodiment.

FIG. 14 is a partial cross-sectional view of a wireless communication device according to yet another embodiment of the present invention.

As shown in FIG. 14, in a wireless communication device 410 according to the yet another embodiment, the RFIC module 30 with its central portion in the longitudinal direction (e.g., the X-axis direction) flexed convexly on the opposite side with respect to the sticky layer 80 is adhered to the sticky layer 80. This configuration allows the edge of the first main surface 30a of the RFIC module 30 to be caught as a wedge by the sticky layer 80, to improve the intimate adhesion properties of the RFIC module 30 on the sticky layer 80, that is, the intimate adhesion properties of the terminal electrodes 36A and 36B on the sticky layer 80. As a result, air is restrained from existing between the terminal electrodes 36A and 36B and the sticky layer 80.

Note that adhesion between the thus flexed RFIC module 30 and the sticky layer 80 is feasible by pressing both ends of the RFIC module 30 to adhere the RFIC module 30 to the sticky layer 80. Also, in the case of an adhesive layer of solder, a thermosetting adhesive, etc., it is extremely difficult to bond the RFIC module in a flexed state to the adhesive layer. The reason is that in the case of the adhesive layer, the RFIC module must be kept in a flexed state until the adhesive layer is completely cured.

Although some exemplary embodiments of the present invention have been mentioned, it will be obvious to those skilled in the art that an embodiment can be combined with at least one other embodiment, as a whole or in part, to obtain a further embodiment according to the present invention.

REFERENCE NUMBERS 10 wireless communication device
20 antenna member
20a first main surface
22 antenna base material
24A antenna pattern
24B antenna pattern
24Ab coupling portion (first coupling portion)
24Bb coupling portion (second coupling portion)
30 RFIC module
30a first main surface
34 RFIC chip
36A terminal electrode (first terminal electrode)
36B terminal electrode (second terminal electrode)
80 sticky layer

What is claimed:

1. A wireless communication device comprising:
   a radio-frequency integrated circuit (RFIC) module that includes an RFIC chip, a plate-shaped module base having planar dimensions larger than planar dimensions of the RFIC chip and on which the RFIC chip is disposed, and first and second terminal electrodes connected to the RFIC chip and disposed on the module base;
   an antenna member that includes an antenna base and an antenna pattern disposed thereon and having first and second coupling portions; and
   an insulating sticky layer disposed between the RFIC module and a main surface of the antenna member on which the first and second coupling portions are disposed, the insulating sticky layer constructed for bonding the RFIC module to the antenna member,
   wherein the first terminal electrode is capacitively coupled to the first coupling portion with the insulating sticky layer disposed in between,
   wherein the second terminal electrode is capacitively coupled to the second coupling portion with the insulating sticky layer disposed in between,
   wherein, in a stacking direction of the RFIC module, the insulating sticky layer, and the antenna member, the first coupling portion comprises a size that is larger than a size of the first terminal electrode, and the second coupling portion comprises a size that is larger than a size of the second terminal electrode, and
   wherein, in the stacking direction, a first region enclosing the first and second terminal electrodes in a minimum area lies within a contour line of the insulating sticky layer, and the insulating sticky layer lies within a second region enclosing the first and second coupling portions in a minimum area.

2. The wireless communication device of claim 1, wherein a sticking strength between the RFIC module and the insulating sticky layer is smaller than a sticking strength between the first and second coupling portions and the insulating sticky layer.

3. The wireless communication device of claim 2,
   wherein the first and second terminal electrodes are disposed on a main surface of the RFIC module that faces a main surface of the antenna member, and
   wherein a sticking strength between the first and second terminal electrodes and the insulating sticky layer is smaller than the sticking strength between the first and second coupling portions and the insulating sticky layer.

4. The wireless communication device of claim 3, wherein contact surfaces of the first and second terminal electrodes in contact with the insulating sticky layer have a lower surface roughness than a surface roughness of contact surfaces of the first and second coupling portions in contact with the insulating sticky layer.

5. The wireless communication device of claim 3, further comprising a space disposed between the insulating sticky layer and a portion of the RFIC module between the first terminal electrode and the second terminal electrode relative to a lengthwise direction of the RFIC module.

6. The wireless communication device of claim 1, wherein the insulating sticky layer is disposed continuously on the first coupling portion, the second coupling portion, and a portion of the antenna base between the first coupling portion and the second coupling portion.

7. The wireless communication device of claim 1, wherein, in the stacking direction, a pitch spacing between the first coupling portion and the second coupling portion and a pitch spacing between the first terminal electrode and the second terminal electrode are defined such that the first terminal electrode is disposed at a center of the first coupling portion and the second terminal electrode is disposed at a center of the second coupling portion.

8. The wireless communication device of claim 1, wherein the RFIC module comprises a matching circuit disposed between the RFIC chip and the first and second terminal electrodes.

9. The wireless communication device of claim 8, wherein the matching circuit is constructed to match the RFIC chip and the first and second terminal electrodes at a predetermined resonance frequency that is configured as a communication frequency of the wireless communication device.

10. The wireless communication device of claim 1, further comprising a cover member disposed on the antenna member so as to cover the RFIC module.

11. The wireless communication device of claim 1, wherein the RFIC chip is formed in the module base.

12. The wireless communication device of claim 1, wherein the module base and the antenna base each comprise a flexible material.

13. The wireless communication device of claim 12, wherein the RFIC module is adhered to the insulating sticky layer with a central portion of the RFIC module flexed convexly opposite to the insulating sticky layer.

14. The wireless communication device of claim 1, wherein the antenna pattern comprises first and second radiating portions that are disposed on the antenna base and are coupled to the first and second coupling portions, respectively.

15. The wireless communication device of claim 14, wherein the first and second radiating portions are dipole antennas and each have a meander shape that extends towards respective opposing ends of the antenna base and each include a U-turn at the respective ends, such that respective open ends of the antenna pattern are capacitively coupled to central portions of the first and second radiating portions, respectively.

16. A wireless communication device comprising:
a plate-shaped module base;
an RFIC chip disposed on the module base, with the module base having planar dimensions that are larger than planar dimensions of the RFIC chip;
first and second terminal electrodes disposed on the module base and connected to the RFIC chip;
an antenna member that includes an antenna base and an antenna pattern disposed on the antenna base and having first and second coupling portions capacitively coupled to the first and second terminal electrodes, respectively; and
an insulating adhesive layer disposed between the RFIC module and a surface of the antenna member on which the first and second coupling portions are disposed, such that the insulating adhesive layer bonds the first and second coupling portions to the first and second terminal electrodes, respectively,
wherein, in a stacking direction of the plate-shaped module base and the insulating adhesive layer, the first coupling portion comprises a size that is larger than a size of the first terminal electrode, and the second coupling portion comprises a size that is larger than a size of the second terminal electrode, and
wherein, in the stacking direction, a first region enclosing the first and second terminal electrodes in a minimum area lies within a contour line of the insulating adhesive layer, and the insulating adhesive layer lies within a second region enclosing the first and second coupling portions in a minimum area.

17. The wireless communication device of claim 16, wherein a sticking strength between the first and second terminal electrodes and the insulating adhesive layer is smaller than a sticking strength between the first and second coupling portions and the insulating adhesive layer.

18. The wireless communication device of claim 17, wherein the first and second terminal electrodes are disposed on a main surface of the plate-shaped module base that faces a main surface of the antenna member.

* * * * *